US006112943A

United States Patent [19]

Lauer

[11] Patent Number: 6,112,943

[45] Date of Patent: Sep. 5, 2000

[54] VENDING MACHINE FOR BOTTLES AND METHOD OF VENDING BOTTLES

[75] Inventor: Thomas Lauer, Chesterland, Ohio

[73] Assignee: Vendcraft Inc, Cleveland, Ohio

[21] Appl. No.: 09/121,925

[22] Filed: Jul. 24, 1998

[51] Int. Cl.[7] .................... B65G 59/00

[52] U.S. Cl. .................... 221/289; 211/59.2

[58] Field of Search .................... 221/289, 298, 221/312 R, 131, 193, 296, 194, 195; 211/59.2

[56] References Cited

U.S. PATENT DOCUMENTS

| | | | |
|---|---|---|---|
| D. 362,463 | 9/1995 | Vogelphol et al. | D20/4 |
| 2,261,910 | 11/1941 | Wright | 312/87 |
| 2,359,984 | 10/1944 | Garner | 312/48 |
| 2,393,370 | 1/1946 | Hamilton | 312/96 |
| 2,563,204 | 8/1951 | Andrews | 312/48 |
| 4,269,325 | 5/1981 | Durham et al. | 221/194 |
| 4,949,868 | 8/1990 | Olson | 221/64 |
| 5,505,332 | 4/1996 | Vogelohl et al. | 221/1 |
| 5,586,687 | 12/1996 | Spamer et al. | 221/289 |

FOREIGN PATENT DOCUMENTS

| | | | |
|---|---|---|---|
| 0228737 | 9/1989 | Japan | 221/191 |

OTHER PUBLICATIONS

Mead's Necktracker Advertisement.

H.S. Beverage Merchandising "Neck–Glide" System—Advertisement.

ECC Vending Products Advertisement.

*Primary Examiner*—Kenneth W. Noland

[57] ABSTRACT

A vending machine for vending a plurality of bottles each of which are supported in an upright position only at a top portion of each of the bottles include a planar dispensing rack having a plurality of elongated slots therein for storing and dispensing bottles. The elongated slots each include a pair of substantially parallel spaced apart side walls which are spaced apart a distance less than a diameter of the top portion of the bottle to be supported in the slots. The side walls of each of the slots terminate in an opening at one end of each of the slots which opening has a diameter larger than the diameter of the top portion of the bottles supported by the slots to enable bottles which move from the slot to the opening to drop through the opening from the planar dispensing rack to a dispensing station. A gating member is provided to control movement of the bottles from each of the slots to the opening to effect movement of a bottle from the dispensing rack to the dispensing station.

20 Claims, 5 Drawing Sheets

VENDING MACHINE FOR BOTTLES AND METHOD OF VENDING BOTTLES

TECHNICAL FIELD

The present invention relates to vending machines and method for vending bottles and more particularly to a simple, low cost vending machine and method for sequentially vending bottles which are supported in an upright position only at a top portion of the bottles. The vending machine includes a planar dispensing rack having a plurality of elongated slots therein for storing and dispensing bottles from the dispensing rack to a dispensing station from which bottles may be removed from the vending machine. Each of the slots include a pair of substantially parallel spaced apart side walls which terminate at one end in an opening which is larger than the top portion of the bottles supported in the elongated slot to enable bottles which move from the slot into the opening to fall from the dispensing rack to the dispensing station. A pivotable gating member and a method of controlling the gating member is provided to control movement of bottles from the slot to the opening.

BACKGROUND OF THE INVENTION

Vending machines are well known for vending articles such as bottled soda and other beverages. Many known prior art vending machines cost in the range of $3,000 to $5,000 and include complicated and costly mechanisms for storing and dispensing bottles.

Known mechanisms in the prior art have been utilized to dispense bottles which are supported in an upright position only at a top portion of the bottle. However, such known prior art mechanisms are both costly and complicated. The known prior art such as the "Neck-Glide" system sold by H & S Beverage Merchandising in Englewood, New Jersey or the "Nektracker" sold by Mead in Atlanta, Ga., require the use of complicated injection molded tracks to support and dispense bottles. In addition, the devices such as sold by Mead and H & S Beverage Merchandising only store and dispense bottles in contrast to the vending machine of the present invention which is operable to store, dispense and vend bottles when coins of a predetermined value are received in the vending machine. Other known mechanisms such as the typical chest type soda vending machines of the 1950's require costly vending and storage mechanisms and thus do not provide a simple low cost apparatus for vending bottles.

SUMMARY OF THE INVENTION

The present invention provides a simple, low cost vending machine for vending bottles which are supported in an upright position only at a top portion of the bottles.

The present invention provides a new and improved vending machine for vending a plurality of bottles which are supported in an upright position only at a top portion of the bottles including a storage cabinet having a dispensing station therein, and a planar dispensing rack located in the storage cabinet having at least a single elongated slot for storing and dispensing bottles from the dispensing rack. The slot includes a pair of substantially parallel spaced apart side walls which terminate at one end in an opening. The pair of substantially parallel side walls are spaced apart a distance which is less than the diameter of the top portion of the bottles which are supported in the elongated slot and the opening at the one end of the slot is larger than the diameter of the top portion of the bottles which are supported in the slot to enable bottles which move from the slot to the opening to fall from the dispensing rack to the dispensing station. A pivotable gating member is provided for controlling movement of the bottles from the slot to the opening. The gating member is pivotable between a blocking position in which the gating member prevents movement of bottles in the slot to the opening and dispensing position in which the gating member allows movement of the next bottle to be vended from the slot to the opening. A locking mechanism is provided for locking the gating member in its blocking position. A coin mechanism is connected to the locking mechanism for activating the locking mechanism when coins of a predetermined value are received in the coin mechanism. The coin mechanism is actuated to unlock the locking mechanism to enable the gating member to pivot to its dispensing position in which the next bottle to be vended moves from the slot to the opening to enable the bottle to drop to the dispensing station.

The present invention further provides a new and improved vending machine for vending a plurality of bottles supported in an upright position only at the top portion of the bottles including a storage cabinet having a dispensing station therein, a first planar dispensing rack located in the storage cabinet having a plurality of substantially parallel elongated slots therein for storing bottles and dispensing bottles wherein each of the plurality of slots includes a pair of substantially parallel spaced apart side walls which terminate at one end thereof in an opening with each of the pair of spaced apart side walls being spaced apart a distance which is less than the diameter of the top portion of the bottles supported in the elongated slots to prevent bottles from falling from the elongated slots and each of the openings at the one end of the slots have a diameter which is larger than the diameter of the top portion of the bottle supported in the slots to enable bottles which move from the slots to the openings to fall from the openings to the dispensing station. A plurality of gating members, each of which is associated with one of the plurality of slots, are provided for controlling movement of bottles from the associated slot to its opening at one end thereof. Each of the gating members is pivotable between a blocking position in which the gating member blocks movement of the next bottle to be vended from the slot to the opening and a dispensing position in which the gating member allows movement of the next bottle to be vended from the slot to the opening. A plurality of locking mechanism are provided for locking each of the gating members in their blocking position. A coin mechanism is provided and connected to the locking mechanisms for actuating a selected locking mechanism when coins of a predetermined value are received in the coin mechanism and the coin mechanism is actuated to actuate the selected locking mechanism to enable the associated gating member to pivot from its blocking position to its dispensing position in which the gating member engages the new next bottle to be vended in the associated slot after the next bottle to be vended moves from the slot to the opening and drops to the dispensing station.

Still another provision of the present invention is to provide a new and improved vending machine as set forth in the preceding paragraph further including a second planar dispensing rack located below said first planar dispensing rack and having a plurality of substantially parallel elongated slots therein each of which terminates at one end thereof in an opening for storing and dispensing bottles from the second planar dispensing rack. The plurality of slots in the second planar dispensing rack are substantially aligned in a vertical direction with the plurality of slots in the first planar dispensing rack.

A further provision of the present invention is to provide a new and improved method of vending bottles from a vending machine in which a plurality of bottles are supported at a top portion of the bottle in the slot in an inclined dispensing rack using a pivotable gating member which is selectively engagable with a locking member which prevents pivotable movement of the gating member to control the sequential movement of bottles to be vended through the slot in the inclined dispensing rack under the influence of gravity including the steps of providing a slot in an inclined dispensing rack for supporting the top portions of bottles which includes an opening at one end through which the top portion of the bottles can pass when a bottle is dispensed, supporting at a top portion a plurality of bottles to be vended in the inclined dispensing rack which move under the influence of gravity through the slot toward the one end thereof, locating the pivotable gating member adjacent the slot to control movement of the bottles through the slot to the opening, engaging the locking member with the gating member to lock the gating member in the first position in which the gating member engages with the top portion of the next bottle to be vended to block movement of the next bottle to be vended to the opening at one end of the slot, disengaging the locking member from the gating member to unlock the gating member and allow the gating member to pivot in a first direction to a second position under the influence of the top portion of the next bottle to be vended as the next bottle to be vended slides under the influence of gravity in a downwardly direction through the slots to the opening at one end thereof, and disengaging the next bottle to be vended from the first portion of the gating member when the gating member is in its second position and the next bottle to be vended drops from the slot through the opening.

DESCRIPTION OF THE PREFERRED EMBODIMENT.

Figure 1:
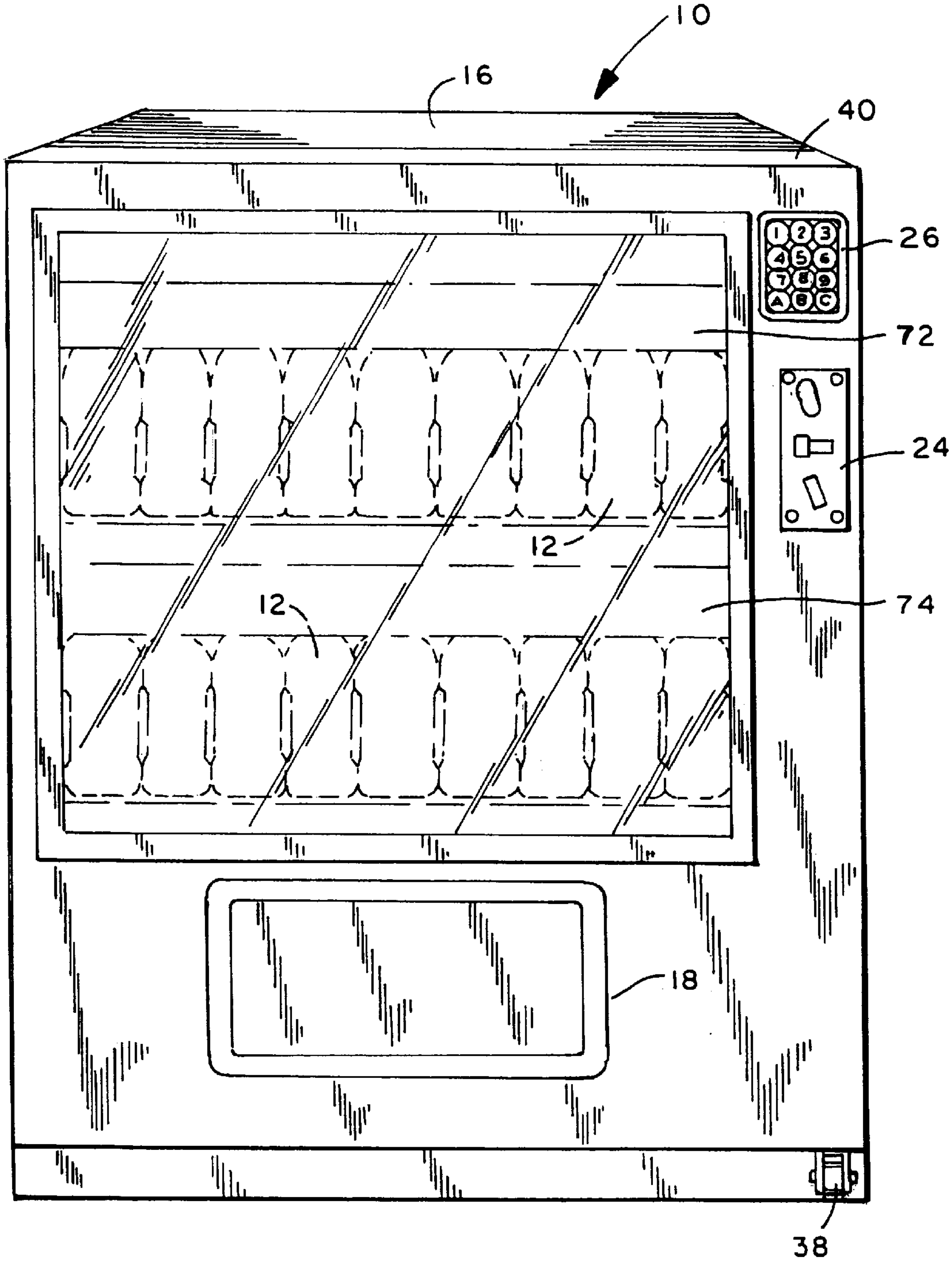
FIG. 1 is a perspective front view the vending machine constructed in accordance with the present invention.
Figure 2:
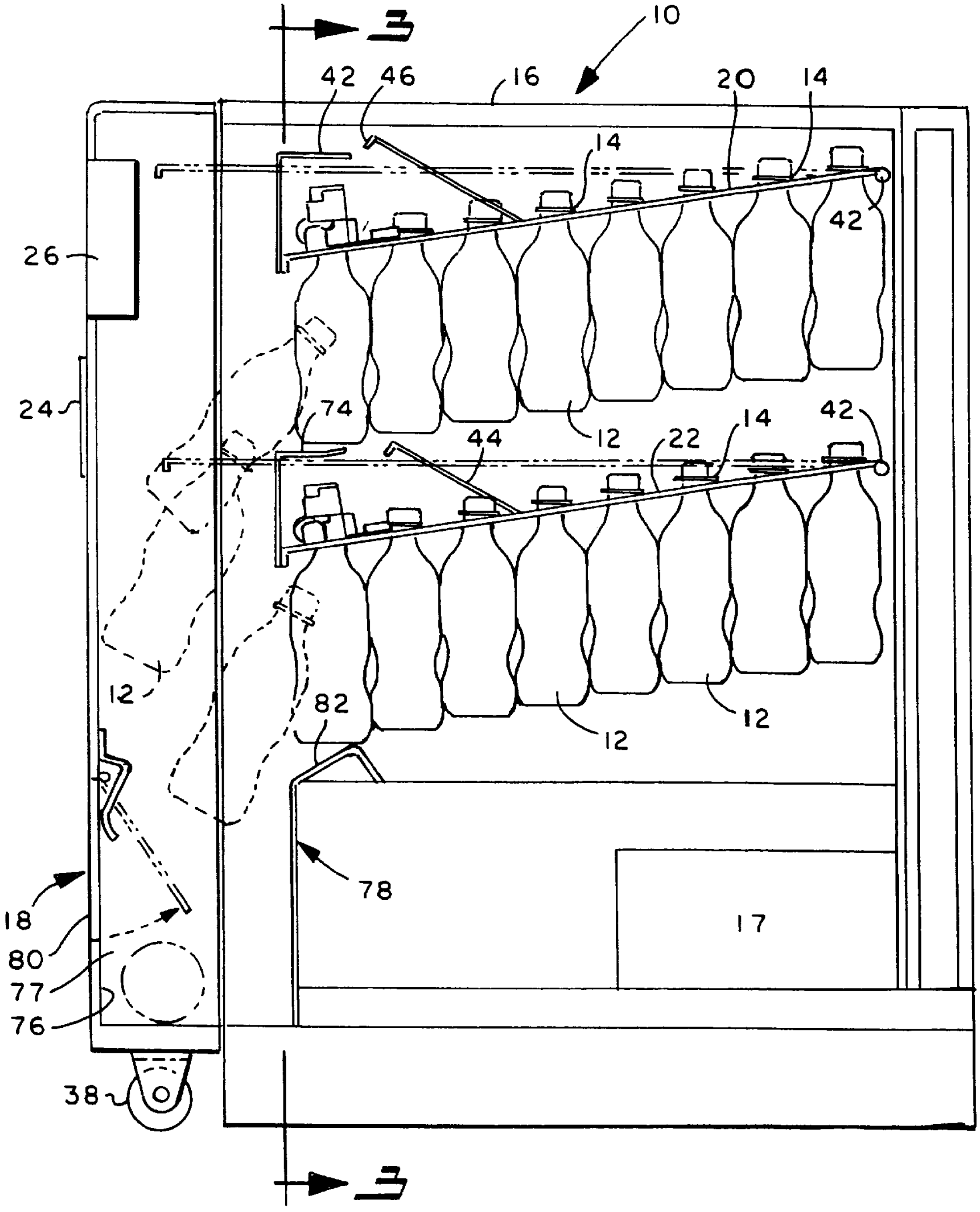
FIG. 2 is a side cross-sectional view of a vending machine constructed in accordance with the present invention, more fully illustrating the dispensing racks and dispensing station.

Referring to the figures and more particularly to FIGS. 1 and 2, a vending machine 10 constructed in accordance with the present invention is illustrated. The vending machine 10 is particularly designed to vend bottles 12 which are supported in an upright position only at a top portion 14 of the bottles and includes a cabinet 16 having a bottle dispensing station 18 disposed therein. A compressor 17 can be located within the storage cabinet 16 to cool the bottles 12 stored therein in a well known manner. When a bottle 12 is to be vended the bottle is moved to the bottle dispensing station 18 where the bottle can be removed from the vending machine 10 by a purchaser. First and second planar dispensing racks 20,22 are located in the storage cabinet 16 for storing a plurality of bottles 12 within the cabinet 16. A coin mechanism 24 is located on the front of the storage cabinet 16 and includes a key pay 26 for selecting a particular selection to be vended from the dispensing racks 20,22 of the vending machine 10.

The storage cabinet 16 includes a door 40 on the front of cabinet 16 which is pivotable relative to the storage cabinet 16 in a well known manner to allow access to the interior of the vending machine 10. A roller 38 is provided for in part supporting the door 40 when the door 40 is in its open position. The door 40 supports the coin mechanism 24 and defines a portion of the dispensing station 18.

The cabinet door 40 includes a window 74 which when the door is in its closed position is disposed adjacent the front of the dispensing racks 20,22 to allow viewing of the bottles 12 disposed in the slots 30 in the dispensing racks. Each of the selections in the dispensing racks 20,22 will include an associated designation which can be entered into the coin mechanism to select the desired selection.

Figure 4:
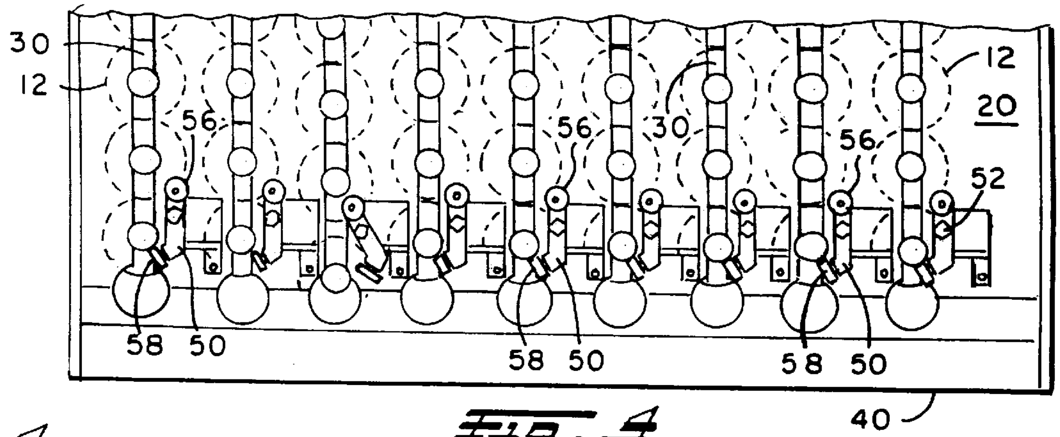
FIG. 4 is a cross-sectional top view taken approximately along lines 4—4 of FIG. 3.
Figure 3:
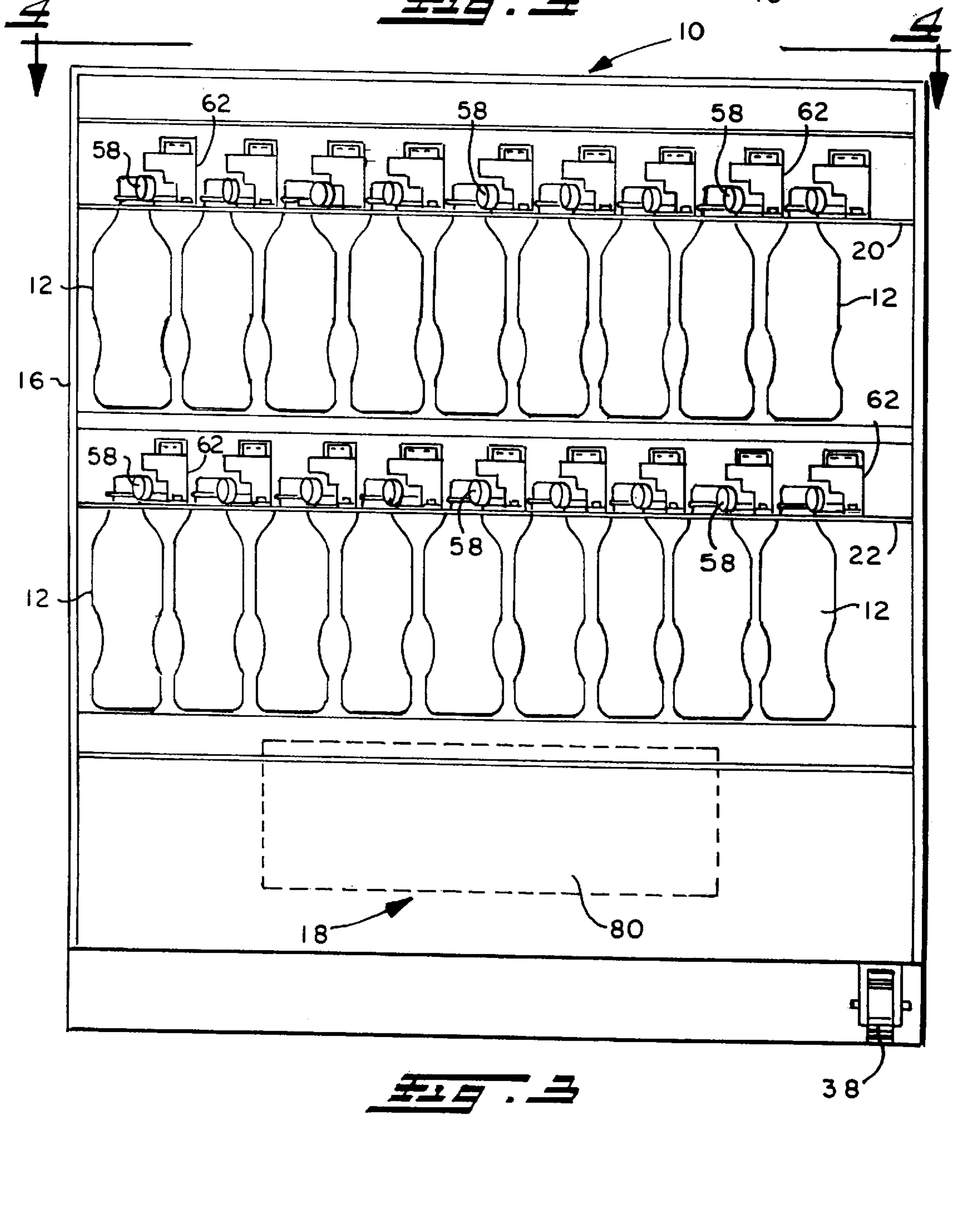
FIG. 3 is a front, partially cross-sectional view of the vending machine of the present invention taken approximately along the lines 3—3 of FIG. 2.
Figure 5:
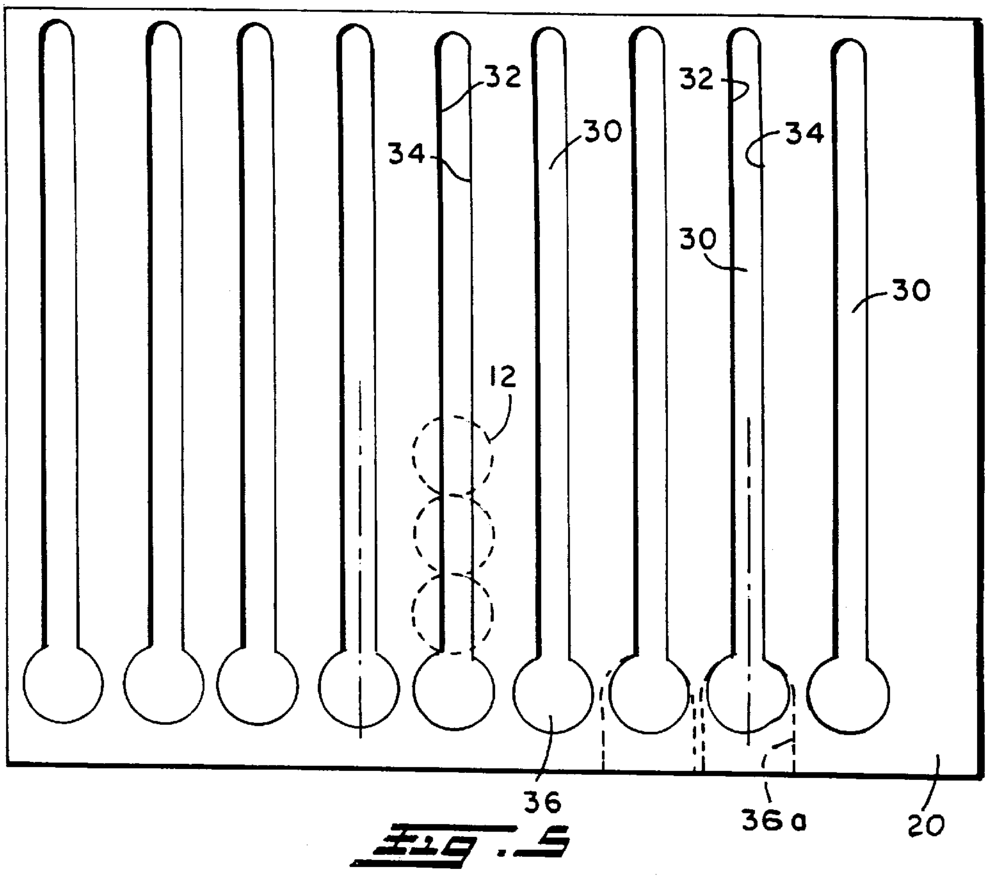
FIG. 5 is a top view of the dispensing rack more fully illustrating the construction of the slots and openings disposed at one end thereof.

Each of the planar dispensing racks 20,22 is adapted to store a plurality of bottles to be vended therein. While the construction of only one of the planar dispensing racks 22 will be described in detail, it should be appreciated that the construction of planar dispensing racks 20 and 22 is similar. The planar dispensing rack 22, more fully disclosed in FIGS. 4 and 5 includes a plurality of elongated slots 30 for storing and dispensing bottles from the planar dispensing rack 22. The plurality of elongated slots 30 are substantially parallel to each other and each include a pair of spaced apart substantially parallel side walls 32,34 which are spaced apart a distance which is smaller than the diameter of the top portion 14 of the bottles to be supported in the planar dispensing rack 22. The side walls 32,34 of each of the slots 30 terminate at one end in an opening 36 which has a diameter which is larger than the top portion 14 of the bottles 12 which are supported in the elongated slots 30. While opening 36 is illustrated as a circular opening 36, it should be appreciated that the opening 36 does not have to be a continuous circular opening and could have a construction in which the side wall 32,34 diverge away from each other as is illustrated in phantom lines at 36*a* in FIG. 5. Each of the planar dispensing racks 20, 22 can, in the preferred embodiment, be easily and inexpensively formed sheet metal.

As is more fully illustrated in FIG. 2, each of the bottles 12 includes a top portion 14 which has a diameter which is larger than the distance between the spaced apart side walls 32,34 of each of the slots 30. The top portion 14 of the bottle 12 can include a ridge or protrubance on the bottle or may include a portion of the cap of the bottle 12. However, it is important that the diameter of the top portion 14 be greater than the diameter of slot 30. The top portion 14 of each of the bottles 12 slides on the top surface of the planar dispensing rack adjacent to the side walls 32,33. In the present embodiment, the width of the slots 30 is approximately 1.075 inches which allow the slots to accommodate 12, 16 and 20 ounce glass or plastic bottles. (Is there a name for these bottles?)

The bottle portion 14 of each of the bottles 12 is adapted to support the bottles 12 in the slots 30. The top portion 14 engages and slides on the top portion of the planar dispensing racks adjacent to the side walls 32,34 of slots 20,22. Each of the planar dispensing racks 20,22 is inclined, in the preferred embodiment, approximately 15 degrees from horizontal in a downwardly direction toward the openings 36 located at one end of the slots 30 as is illustrated in FIG. 2. When a plurality of bottles 12 are located in the elongated slots 30 the bottles slide solely under the influence of gravity toward the one end of the dispensing rack at which the openings 36 are located. As is illustrated in FIG. 2, the bottles have a generally vertical orientation as they slide through the slots 30 in the planar dispensing racks 20,22 toward openings 36.

The rear portion of each of the planar storage racks 20,22 is supported on a pair of pivot pins 42, one of which is illustrated in FIG. 2, to allow each of the planar dispensing racks 20,22 to move from its full line position illustrated in FIG. 2 in which the planar dispensing racks 20,22 are inclined, to its phantom line position illustrated in FIG. 2 in which the planar dispensing racks 20,22 have a generally horizontal orientation and extend about four inches out of the frong of cabinet 16 to facilitate loading of racks 20 & 22. Tracks 44 are disposed in the side walls of the storage cabinet 16 and accommodate a roller means, not illustrated, which is attached to the planar dispensing racks 20,22 and which slides in track 44 when the planar dispensing racks 20,22 are pivoted from their inclined position to their horizontal position. The pivot pins 42 are each located in a horizontal slot, not illustrated, which allows the back of each of the racks 20,22 to move toward the front of cabinet 16 while the front of each of the racks 20,22 are lifted upwardly and moved forward in tracks 44. The racks 20,22 are moveable to a horizontal position to facilitate loading of the dispensing racks 20,22 with bottles 12 to be vended when the door 40 is opened and the vending machine is serviced. A suitable dog 46 can be located at one end of each of the tracks 44 to support the dispensing racks 20,22 in a substantially horizontal position while the racks are loaded with bottles to be vended. While only one track 44 is illustrated associated with each of the planar dispensing racks 20,22 it should be appreciated that a track 44 can be located on each side wall of the cabinet 16 to support each side of the dispensing racks 20,22. Additionally, if desired a door, not illustrated, can be provided in the rear of cabinet 16 to load the racks 20,22 from the rear while the racks are located in an inclined position. If a door is located in the rear of the cabinet 16 for loading racks 20,22, the slots 30 can be modified to allow bottles 12 to be loaded into the rear of each slot 30.

A plurality of gating members 50 are each pivotally supported about a pivot pin 52 on each of the dispensing racks 20,22. Each of the gating members 50 is disposed adjacent to one of the slots 30 at the juncture of the slot 30 and the opening 36 for controlling sliding movement of the bottles 12 through the slot 30 into the opening 36. The gating member 50 includes a pair of arms 54,56 which extend in opposite directions from the pivot pin 52 for engaging with the bottles 12 to control the movement of the bottles through the slot 30 to the opening 36. A roller 58 is located on the end of arm 54 and a roller 60 is located on the end of arm 56. The rollers 58 and 60 engage with the top portions 14 of the bottles 12 as will be more fully described herein below to control movement of the bottles 12 through slot 30 and into the opening 36.

The gate member 50 is pivotable about the shaft 52 which is supported in an opening, not illustrated, in the dispensing rack. The shaft 52 about which gate member 50 pivots is disposed substantially perpendicular to the gate member 50 and allows the gate member to pivot in both a clockwise and counterclockwise direction as is viewed in FIGS. 4 and 8. The gate member 50 has a blocking position illustrated in FIG. 8*a* wherein the roller 58 engages with the next bottle 12 to be vended and prevents movement of the next bottle to be vended from the slot 30 into the opening 36. The gate member 50 is operable to rotate in a counterclockwise direction from its blocking position illustrated in FIG. 8*a* to a dispensing position illustrated in FIG. 8*c*. When the gate member 50 is in its dispensing position the gate member is rotated by movement of the next bottle to be vended through the slot 12 and allows the next bottle to be vended to move into opening 36 and the bottle 12 drops through opening 36 to the dispensing station 18.

Figure 6:
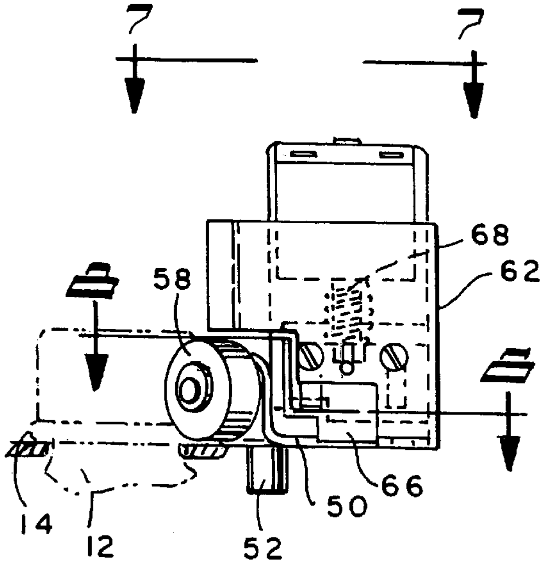
FIG. 6 is a front view more fully illustrating the locking mechanism and gating member.
Figure 7:
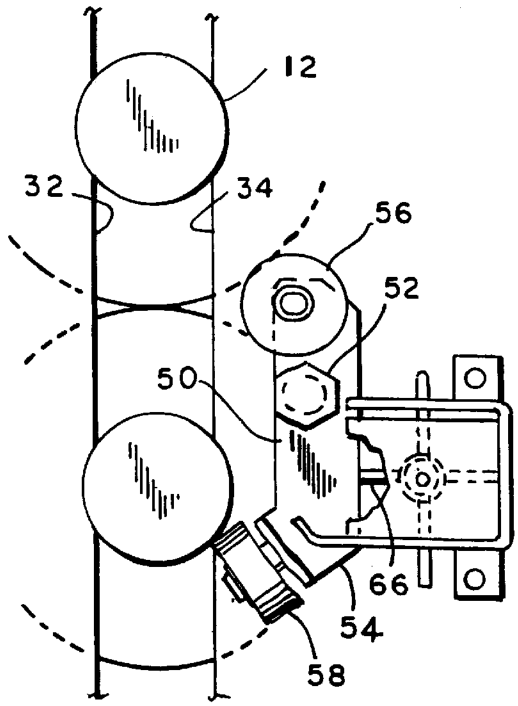
FIG. 7 is a top view taken approximately along the lines 7—7 of FIG. 6 illustrating the locking mechanism in its unactuated position in which the locking member engages the gage member to prevent rotation of the gate member in a counterclockwise direction as viewed in FIG. 7.
Figure 8A:
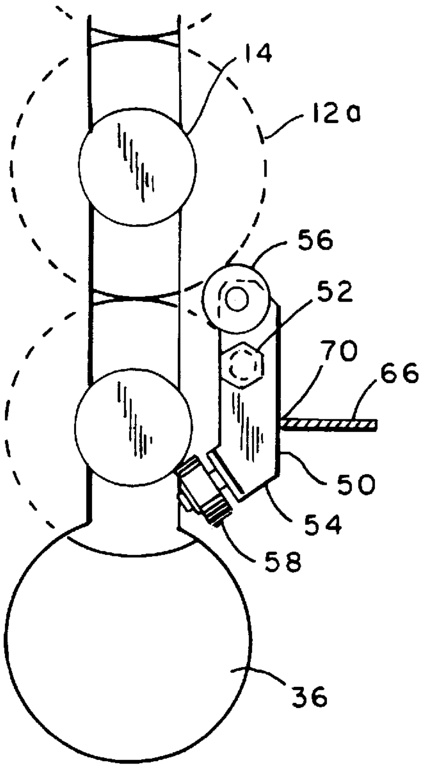
FIGS. 8*a*–8*e* are fragmentary top views taken approximately along lines 9—9 of FIG. 6 more fully illustrating the sequential movement of the gating members as the bottles are sequentially moved in the upper dispensing rack from the slots to the openings.
Figure 8B:
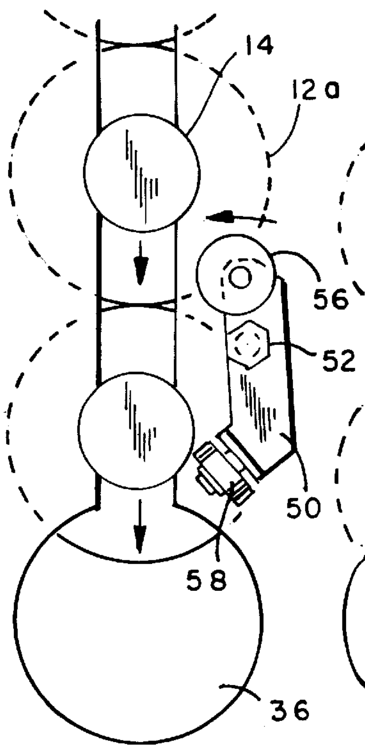
Figure 8C:
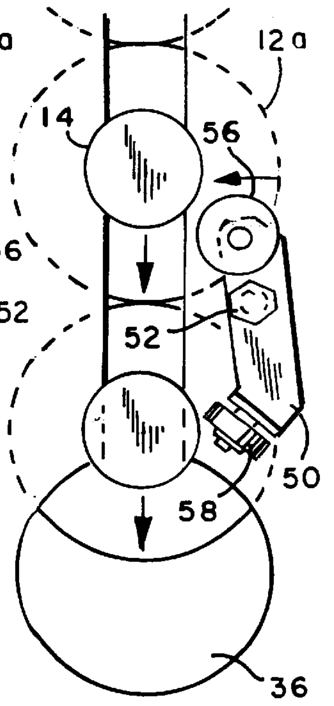

A locking mechanism 62 including a solenoid 64 and a locking member 66 is disposed adjacent each gating member 50 for locking its associated gating member 50 in its blocking position illustrated at FIG. 8*a*. The locking mechanism more fully illustrated in FIGS. 6 and 7 includes a spring biased plunger 68 which is connected to the locking member 66 and which normally biases the locking member 66 in a downwardly direction to its position illustrated in FIG. 6. In this position, the locking member 66 is operable to engage with an edge 70 of the gate member 50 when the gate member 50 is in its blocking position illustrated in FIG. 8*a* to prevent rotation of the gating member 50 in a counterclockwise position.

Figure 8D:
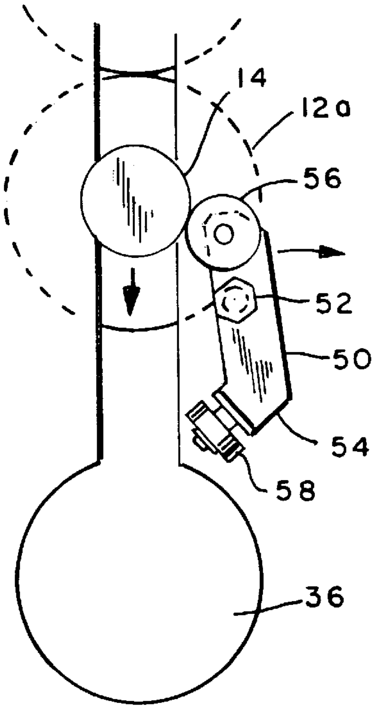
Figure 8E:
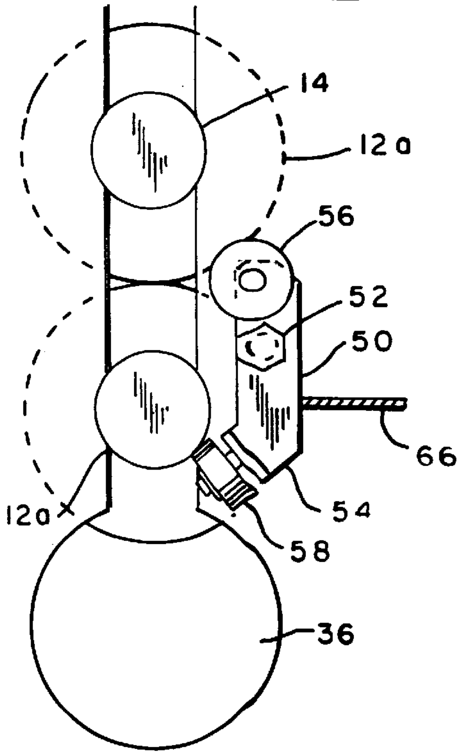

Each of the slots 30 in the dispensing racks 20,22 may have a different selection of bottles to be vended. For example, one slot 30 may hold bottles of water, another orange juice and still another soda pop. These selections are viewed through the window in door 40 and preferably each slot is labeled with a number. When coins of a predetermined value are deposited in the coin mechanism 24 a particular selection is chosen by entering the number associated with the selection in the key pad 26. The coin mechanism 24 then energizes the solenoid 64 associated with the selected bottle to be vended. Energization of the solenoid 64 moves the locking member 66 in a upwardly direction as is viewed in FIG. 6 to disengage the locking member 66 from the gating member 50 to unlock the gating member 50. The bottles 12 to be vended in slot 30 then start to slide under the influence of gravity due to the fact that the dispensing rack in inclined. The next bottle to be vended engages with roller 58 and rotates the now unlocked gating member 50 in a counterclockwise direction about pivot pin 52 from its blocking position illustrated in FIG. 8*a* to its position illustrated in FIG. 8*b* and to its dispensing position illustrated in FIG. 8*c* at which time the bottle 12 to be vended has slid from slot 30 to opening 36 where the bottle 12 drops through opening 36 to the dispensing station 18 as is illustrated in FIG. 2. After the next bottle to be vended drops through opening 36, roller 60 on arm 56 of the gating member 50 engages with the top portion 14 of the new next bottle 12*a* to be vended as the bottle 12*a* slides through slot 30. As the new next bottle 12*a* to be vended engages with roller 60, as is illustrated in FIG. 8*d*, the new next bottle 12*a* to be vended biases the gating member 50 in a clockwise direction about pivot shaft 52. The new next bottle 12*a* to be vended continues to rotate gating member 50 in a clockwise direction toward gate member 50's blocking position illustrated in FIG. 8*e* and FIG. 8*a* in which gating member 50 blocks movement of the new next bottle 12*a* to be vended from the slot 30 to the opening 36.

The locking mechanism 62 does not move gating member 50. The locking mechanism 62 is operable to engage with gating member 50 to lock the gating member 50 in its blocking position. Clockwise and counterclockwise rotation of the gating member 50 is occasioned solely by the bottles 12 sliding through slot 30 under the influence of gravity and engaging with the rollers 58 and 60 supported on arms 54 and 56, respectively, of the gating member 50. While rollers 58 and 60 have been disclosed as positioned on the end of the arms 54 and 56 of the gate member, it should be appreciated that gate member 50 could be formed with the rollers 58 and 60 as an integral portion of the gate member 50. For example, the gate member 50 could be formed as one piece molded member having integrally formed curved surfaces instead of rollers 58 and 60, which curved surfaces would engage with the top portion 14 of the bottles 12 to meter movement of the bottles from the slot 30 to opening 36. The curved surfaces on rollers 58 and 60 facilitates the pivoting movement of the gate member 50 by the top portions 14 of the bottles as the bottles move through the slot 30 relative to the gate member 50.

When a bottle 12 is released from the planar dispensing rack 20, the bottle 12 drops from opening 36 to the dispensing station 18 which includes a chamber 77 formed by an inner portion 76 of the door 40 and a sheet metal member 78 in the main cabinet 16 which cooperate to define a chamber 77 into which the bottle 12 may drop when the bottle moves to the dispensing station 18. A deflector member 74 is mounted on the lower planar dispensing rack 22 to engage with the bottles falling from the upper planar dispensing rack 20 to guide bottles 12 falling from the upper dispensing rack 20 to the dispensing station 18. A deflecting member 82 is provided beneath the planar dispensing rack 22 to deflect bottles falling therefrom to the dispensing station 18. Each of the deflecting member 74 and 82 include surfaces thereon which are operable to engage with the bottles 12 as illustrated in FIG. 2 when the bottles 12 drop through the openings 36 in the dispensing racks and deflect the bottles 12 toward the dispensing station 18. When the bottles 12 drop from either of the dispensing racks 20,22 the bottles 12 are deflected to the left as is viewed in FIG. 2 and drop into chamber 77 at the dispensing station 18. The dispensing station 18 includes a push door 80 which can be pushed opened to allow a user to remove any dispensed bottles 12 from the chamber 77 at the dispensing station 18.

From the foregoing it should be apparent that a new and improved vending machine 10 for vending a plurality of bottles 12 which are supported in an upright position only at a top portion 14 of the bottles 12 has been illustrated. The vending machine 10 includes a storage cabinet 16 including a dispensing station 18 from which bottles 12 may be removed from the storage cabinet 16. A first planar dispensing rack 20 is located in the storage cabinet 16 and includes a plurality of substantially parallel elongated slots 30 located therein for storing bottles and dispensing bottles from the dispensing rack 20. Each of the bottles 12 includes a top portion 14 which is engaged by and supported by the slots 30 in the dispensing rack 20. Each of the plurality of slots includes a pair of substantially parallel spaced apart side walls 32,34 which terminate at one end thereof in an opening 36. The pair of substantially parallel spaced apart side walls are spaced apart a distance which is less than the diameter of the top portion 14 of the bottles 12 which are supported in the elongated slots to prevent the bottles 12 from falling from the elongated slots when bottles are supported by the sides walls 32,34 of the slots 30. Each of the openings 36 at one end of the slots 30 have a diameter which is larger than the diameter of the bottle portion 14 supported in the elongated slot to enable bottles which move from the slots 30 to the openings 36 to fall from the openings 36 in the dispensing rack 20 to the dispensing station 18. The planar dispensing rack 20 is inclined from a horizontal position in a downwardly direction toward the openings 36 at one of the plurality of slots 30 to enable bottles 12 supported in each of the plurality of slots 30 to move under the influence of gravity toward the one end of the slots 30 at which the opening 36 is located. A plurality of gate members 50 are provided, one of which is associated with each of the slots 30, for controlling movement of the bottles 12 in the associated slot from the slot 30 to the opening 36 at one end thereof. A plurality of locking mechanisms 62 are provided, one of which is associated with each of the gate members 50, for locking movement of the gate member in a blocking position in which the gating member 50 blocks movement of bottles 12 through its associated slot 30 to the opening 36. A coin mechanism 24 is provided for actuating a selected locking mechanism 62 to allow movement of the associated gate member 50 from its blocking position to a dispensing position in which the next bottle 12 to be vended engages with the gating member to rotate the gating member as the bottle 12 moves from the slot to the opening 36 and drops to the dispensing station 18.

A method is also disclosed for vending bottles from a bottle vending machine in which a plurality of bottles are supported at a top portion 14 of the bottles in a slot 30 in an inclined dispensing rack 20 using a pivotable gating member 50 which is selectively engageable with a locking member 66 to prevent pivotable movement of the gating member 50 to control the sequential movement of bottles 12 to be vended through the slot 30 in the inclined dispensing rack 20 under the influence of gravity. The method includes the steps of providing a slot 30 in an inclined dispensing rack 20 for supporting the top portion 14 of bottles 12 therein which includes an opening 36 at one end through which the top portion of a bottle 14 can pass when a bottle is dispensed from the slot 30 in the dispensing rack; supporting in a top portion thereof a plurality of bottles 12 to be vended in the slot 30 in the inclined dispensing rack 20 which move under the influence of gravity through the slot 30 toward the one end at which the opening 36 is located; locating the pivotable gating member 50 adjacent the slot 30 to control movement of the bottles through the slot 30 to the opening 36 at the one end of the slot; engaging the locking member 66 with the gating member 50 to lock the gating member in a first position in which a first portion of the gating member engages with the top portion of the next bottle to be vended in the slot 30 to block movement of the next bottle to be vended to the opening 36 at one end of the slot 30; disengaging the locking member 66 from the gating member 50 to unlock the gating member and allow the gating member to pivot in a first direction to a second position under the influence of the top portion 14 of the next bottle 12 to be vended as the next bottle 12 to be vended slides under the influence of gravity in a downwardly direction through the slot 30 to the opening 36 at the one end thereof; disengaging the next bottle 12 to be vended from the first portion 58 of the gating member 50 when the gating member 50 is in its second position and the next bottle to be vended drops from the slot 30 through the opening 36; engaging a new next bottle to be vended 12*a* with a second portion 60 of the gating member 50 to pivot the gating member back to its first blocking position in a second direction, opposite the first direction, as the new next bottle to be vended 12*a* slides under the influence of gravity in a downwardly direction through the slot 30 toward the opening 36; disengaging the new next bottle 12*a* to be vended from the second portion 60 of the gating member 50 when the gating member 50 is in its first position and then engaging the new next bottle to be vended with the first portion 58 of the gating member 50 to bias the gating member 50 in the first direction; and engaging the locking member with gating member 50 to prevent the new next bottle 12*a* to be vended from pivoting the gating member 50 in the first direction and for locking the gating member 50 in its first position in which it blocks movement of the next bottle to be vended from the slot 30 to the opening 36.

What I claim is:

1. A vending machine for vending a plurality of bottles each of which are supported in an upright position only at a top portion of each of the bottles comprising a storage cabinet including a dispensing station from which bottles may be removed from said storage cabinet, a planar dispensing rack located in said storage cabinet having at least a single elongated slot located therein for storing and dispensing bottles from said dispensing rack which bottles each include a top portion which is engaged by and supported by said dispensing rack, said slot including a pair of substantially parallel spaced apart side walls which terminate at one end thereof in an opening in said planar dispensing rack, said pair of substantially parallel spaced apart side walls being spaced apart a distance which is less than the diameter of the top portion of the bottles which are supported in said elongated slot to prevent bottles from falling from said elongated slot when the bottles are supported by said side walls of said slot, said opening in said planar dispensing rack being larger than the diameter of the top portion of the bottles which are supported in said elongated slot to enable bottles which move from said slot into said opening to fall from said dispensing rack to said dispensing station, said planar dispensing rack being inclined from a horizontal position in a downwardly direction toward said opening in said planar dispensing rack to enable bottles supported in said slot in said rack to move under the influence of gravity toward said one end of said slot at which said opening is located, a gate member for controlling movement of the bottles through said slot to said opening, said gate member being pivotable between a blocking position in which said gate member blocks movement of bottles from said slot to said opening and a dispensing position in which said gate member enables the next bottle to be vended to move from said slot to said opening to fall from said dispensing rack to said dispensing station, a locking mechanism for locking said gate member to prevent said gate member from pivoting from said blocking position, a coin mechanism connected to said locking mechanism for unlocking said locking mechanism when coins of a predetermined value are received in said coin mechanism and said coin mechanism is actuated to unlock said locking mechanism to allow said gate member to pivot from said blocking position to said dispensing position to enable the next bottle to be vended to move from said slot to said opening and to drop through said opening from said dispensing rack to said dispensing station.

2. A vending machine for vending a plurality of bottles which are supported in an upright position only at a top portion of the bottles as defined in claim 1 wherein said gating member includes a pair of arms one of which engages with the next bottle to be vended and the other of which engages with the new next bottle to be vended in said slot after the next bottle to be vended when said gate member pivots from said blocking to said dispensing position as the next bottle to be vended moves from said slot to said opening to drop to said dispensing station, said other arm engaging with the new next bottle to be vended to pivot said gating member to said blocking position to block movement of the new next bottle to be vended from said slot to said opening.

3. A vending machine for vending a plurality of bottles which are supported in an upright position only at a top portion of the bottles as defined in claim 2 wherein said gating member is pivotable about an axis of rotation disposed substantially perpendicular to said pair of arms and located on said gating member approximately midway between said pair of arms and wherein said pair of arms control the sequential movement of bottles supported in said slot under the influence of gravity through said slot to said opening at one end thereof.

4. A vending machine for vending a plurality of bottles which are supported in an upright position only at a top portion of the bottles as defined in claim 1 further including a pivotable support for supporting said dispensing rack in said storage cabinet, said dispensing rack being pivotable about said support from said inclined position to a substantially horizontal position to facilitate loading bottles in said dispensing rack.

5. A vending machine for vending a plurality of bottles which are supported in an upright position only at a top portion of the bottles as defined in claim 1 further including window means located in said storage cabinet adjacent to said slot and opening to provide for viewing of the next bottle to be vended which is supported in said slot in said dispensing rack.

6. A vending machine for vending a plurality of bottles which are supported in an upright position only at a top portion of the bottles as defined in claim 1 wherein said locking mechanism includes a solenoid having an armature and a locking member connected to said armature of said solenoid, said solenoid being actuatable by said coin mechanism to move said locking member from a first position in which said locking member engages said gate member to prevent pivotable movement of said gate member from said blocking position to a second position in which said locking member allows said gating member to be pivoted from said blocking position to said dispensing position under the influence of the next bottle to be vended in said slot when said coin mechanism energizes said solenoid to move said locking member from said first position to said second position.

7. A vending machine for vending a plurality of bottles which are supported in an upright position only at a top portion of the bottles as defined in claim 1 wherein said gate member includes a first arm which is pivotable with said gate member to control movement of the next bottle to be vended from said slot to said opening.

8. A vending machine for vending a plurality of bottles which are supported in an upright position only at a top portion of the bottles as defined in claim 7 further including a second arm pivotable with said gating member, said second arm being engageable with the new next bottle to be vended in the slot after the next bottle to be vended has passed from said slot to said opening and said gate member has moved to said dispensing position, said second arm when engaging the new next bottle to be vended in the slot pivots said gate member from said dispensing position to said blocking position where said gate member prevents the new next bottle to be vended from moving from said slot to said opening.

9. A vending machine for vending a plurality of bottles which are supported in an upright position only at a top portion of the bottles as defined in claim 8 further including a curved surface portion at the end of each of said first and second arms for facilitating engagement of the bottles with said first and second arms of said gate member.

10. A vending machine for vending a plurality of bottles each of which are supported in an upright position only at a top portion of each of the bottles comprising a storage cabinet including a dispensing station from which bottles may be removed from said storage cabinet, a first planar dispensing rack located in said storage cabinet having a plurality of substantially parallel elongated slots located therein for storing bottles and dispensing bottles from said first dispensing rack, each of said bottles including said top portion which is engaged by and supported by said slots in said dispensing rack, each of said plurality of slots including a pair of substantially parallel spaced apart side walls which terminate at one end thereof in an opening, each of said pair of substantially parallel spaced apart side walls of each of said slots being spaced apart a distance which is less than the diameter of the top portion of the bottles which are supported in said elongated slots to prevent bottles from falling from said elongated slots when bottles are supported by said side walls of said slots, each of said openings at said one ends of said slots being larger than the diameter of the top portion of the bottles supported in said elongated slot to enable bottles which move from said slot to said opening to fall from said opening in said dispensing rack to said dispensing station, said first planar dispensing rack being inclined from a horizontal position in a downwardly direction toward said openings at said one end of said plurality of slots in said planar dispensing rack to enable bottles supported in each of said plurality of slots in said dispensing rack to move under the influence of gravity toward said one end of said slots at which said openings are located, a plurality of gating members each of which is associated with one of said plurality of slots for controlling the movement of bottles from said associated slot to said opening at one end of said associated slot, each of said plurality of gating members being pivotable from a blocking position in which said gating member blocks movement of the next bottle to be vended from said associated slot to said opening and a dispensing position in which said gating member enables the next bottle to be vended to move from its associated slot to said opening at said one end of said associated slot, a plurality of locking mechanism one of which locks each of said gating members to prevent each of said gating members from pivoting from said blocking position to said dispensing position, a coin mechanism connected to each of said locking mechanisms for unlocking a selected one of said locking mechanisms when coins of a predetermined value are received in said coin mechanism and said locking mechanism is actuated to provide for movement of said associated locking mechanism from its locking position in which said locking mechanism prevents pivotal movement of said associated gating member from said blocking position and bottles from said associated slot are prevented from moving to said opening at one end of associated slot to an unlocking position in which said locking member enables said gating mechanism to pivot to said dispensing position and the next bottle to be vended in said associated slot to move to said opening at said end of said associated slot to enable the bottle to drop through said opening from said dispensing rack to said dispensing station upon actuation of said coin mechanism and movement of said locking mechanism from said locking position to said unlocking position.

11. A vending machine for vending a plurality of bottles which are supported in a upright position only at a top portion of the bottles as defined in claim 10 further including a pivotable support for supporting said planar dispensing rack in said storage cabinet, said dispensing rack being pivotable about said support from said inclined position to a substantially horizontal position to facilitate loading bottles in said plurality of slots in said dispensing rack.

12. A vending machine for vending a plurality of bottles which are supported in an upright position only at a top portion of the bottles as defined in claim 10 further including window means associated with said plurality of slots, said window means being located in said storage cabinet and being associated with said dispensing rack to provide for viewing of the next bottles to be vended in said slots in said dispensing rack.

13. A vending machine for vending a plurality of bottles which are supported in an upright position only at a top portion of the bottles as defined in claim 10 wherein each of said plurality of gating members includes a pair of arms one of which engages with the next bottle to be vended and the other of which engages with the new next bottle to be vended in said slot after the next bottle to be vended when said gate member pivots from said blocking to said dispensing position as the next bottle to be vended moves from said slot to said opening to drop to said dispensing station, said other arm engaging with the new next bottle to be vended to pivot said gating member to said blocking position to block movement of the new next bottle to be vended from said slot to said opening.

14. A vending machine for vending a plurality of bottles which are supported in an upright position only at a top portion of the bottles as defined in claim 13 wherein each of said gating members is pivotable about an axis of rotation disposed substantially perpendicular to said pair of arms and located on said gating member approximately midway between said pair of arms and wherein said pair of arms control the sequential movement of bottles supported in said slot under the influence of gravity through said slot to said opening at one end thereof.

15. A vending machine for vending a plurality of bottles which are supported in an upright position only at a top portion of the bottles as defined in claim 10 wherein said locking mechanism includes a solenoid having an armature and a locking member connected to said armature of said solenoid, said solenoid being actuatable by said coin mechanism to move said locking member from a first position in which said locking member engages an associated gate member to prevent pivotable movement of said associated gate member from said blocking position to a second position in which said locking member allows said associated gating member to be pivoted from said blocking position to said dispensing position under the influence of the next bottle to be vended in said slot when said coin mechanism energizes said solenoid to move said locking member from said first position to said second position.

16. A vending machine for vending a plurality of bottles which are supported in an upright position only at a top portion of the bottles as defined in claim 10 wherein each of said gate members includes a first arm which is pivotable with said gate member to control movement of the next bottle to be vended from said slot to said opening.

17. A vending machine for vending a plurality of bottles which are supported in an upright position only at a top portion of the bottles as defined in claim 16 further including a second arm pivotable with each of said gating members, said second arm being engageable with the new next bottle to be vended in the slot after the next bottle to be vended has passed from said slot to said opening and said gate member has moved to said dispensing position, said second arm when engaging the new next bottle to be vended in the slot pivots said gate member from said dispensing position to said blocking position where said gate member prevents the new next bottle to be vended from moving from said slot to said opening.

18. A method of vending bottles from a bottle vending machine in which a plurality of bottles are supported at a top portion of the bottle in a slot in an inclined dispensing rack using a pivotable gating member which is selectively engageable with a locking member which prevents pivotal movement of the gating member to control the sequential movement of bottles to be vended through the slot in the inclined dispensing rack under the influence of gravity, including the steps of:

1. providing a slot in an inclined dispensing rack for supporting the top portion of bottles therein which includes an opening at one end through which the top portion of a bottle can pass when a bottle is dispensed from the slot in the dispensing rack wherein the dispensing rack is inclined in a downwardly direction toward the one end of the slot;
2. supporting at a top portion thereof a plurality of bottles to be vended in the slot in the inclined dispensing rack which move under the influence of gravity through the slot toward the one end;
3. locating the pivotable gating member adjacent the slot to control movement of the bottles through the slot to the opening at the one end of the slot;
4. engaging the locking member with the gating member to lock the gating member in a first position in which a first portion of the gating member engages with the top portion of the next bottle to be vended in the slot to block movement of the next bottle to be vended to the opening at one end of the slot;
5. disengaging the locking member from the gating member to unlock the gating member and allow the gating member to pivot in a first direction to a second position under the influence of the top portion of a next bottle to be vended as the next bottle to be vended slides under the influence of gravity in a downwardly direction through the slot to the opening at the one end thereof;
6. disengaging the next bottle to be vended from the first portion of the gating member when the gating member is in its second position and the next bottle to be vended drops from the slot through the opening.

19. A method of vending bottles from a bottle vending machine in which a plurality of bottles are supported at a top portion of the bottle in a slot in an inclined dispensing rack using a pivotable gating member which is selectively engageable with a locking member which prevents pivotal movement of the gating member to control the sequential movement of bottles to be vended through the slot in the inclined dispensing rack under the influence of gravity, including the steps of:

1. providing a slot in an inclined dispensing rack for supporting the top portion of bottles therein which includes an opening at one end through which the top portion of a bottle can pass when a bottle is dispensed from the slot in the dispensing rack wherein the dispensing rack is inclined in a downwardly direction toward the one end of the slot;
2. supporting at a top portion thereof a plurality of bottles to be vended in the slot in the inclined dispensing rack which move under the influence of gravity through the slot toward the one end;
3. locating the pivotable gating member adjacent the slot to control movement of the bottles through the slot to the opening at the one end of the slot;
4. engaging the locking member with the gating member to lock the gating member in a first position in which a first portion of the gating member engages with the top portion of the next bottle to be vended in the slot to block movement of the next bottle to be vended to the opening at one end of the slot.
5. disengaging the locking member from the gating member to unlock the gating member and allow the gating member to pivot in a first direction to a second position under the influence of the top portion of a next bottle to be vended as the next bottle to be vended slides under the influence of gravity in a downwardly direction through the slot to the opening at the one end thereof;
6. disengaging the next bottle to be vended from the first portion of the gating member when the gating member is in its second position and the next bottle to be vended drops from the slot through the opening;
7. engaging a new next bottle to be vended with a second portion of the gating member to pivot the gating member back to its first position in a second direction, opposite the first direction, as the new next bottle to be vended slides under the influence of gravity in a downwardly direction through the slot toward the opening;
8. disengaging the new next bottle to be vended from the second portion of the gating member when the gating member is in its first position and then engaging the new next bottle to be vended with the first portion of the gating member to bias the gating member in the first direction; and
9. engaging the locking member with the gating member to prevent the new next bottle to be vended from pivoting the gating member in the first direction and for locking the gating member in its first position.

20. A vending machine for vending a plurality of bottles each of which are supported in an upright position only at a top portion of each of the bottles comprising a storage cabinet, a dispensing rack located in said storage cabinet having at least a single elongated slot located therein for storing and dispensing bottles from said dispensing rack which bottles each include a top portion which is engaged by and supported by said dispensing rack, said slot including a pair of substantially parallel spaced apart side walls which terminate at one end thereof in an opening in said dispensing rack, said pair of substantially parallel spaced apart side walls being spaced apart a distance which is less than the diameter of the top portion of the bottles which are supported in said elongated slot to prevent bottles from falling from said elongated slot when the bottles are supported by said side walls of said slot, said opening in said dispensing rack being larger than the diameter of the top portion of the bottles which are supported in said elongated slot to enable bottles which are supported in said elongated slot to move from said slot into said opening to fall from said dispensing rack, said dispensing rack being inclined from a horizontal position in a downwardly direction toward said opening in said dispensing rack to enable bottles supported in said slot in said rack to move under the influence of gravity toward said one end of said slot at which said opening is located, a gate member for controlling movement of the bottles through said slot to said opening, said gate member being pivotable between a blocking position in which said gate member blocks movement of bottles from said slot to said opening and a dispensing position in which said gate member enables the next bottle to be vended to move from said slot to said opening in said dispensing rack to be vended, a locking mechanism for locking said gate member to prevent said gate member from pivoting from said blocking position, a crediting mechanism connected to said locking mechanism for unlocking said locking mechanism when a credit of a predetermined value is received in said crediting mechanism and said crediting mechanism is actuated to unlock said locking mechanism to allow said gate member to pivot from said blocking position to said dispensing position to enable the next bottle to be vended to move from said slot to said opening to be vended.

* * * * *